J. HODELY.
CUSHION TIRE.
APPLICATION FILED OCT. 29, 1921.
1,406,016.
Patented Feb. 7, 1922.
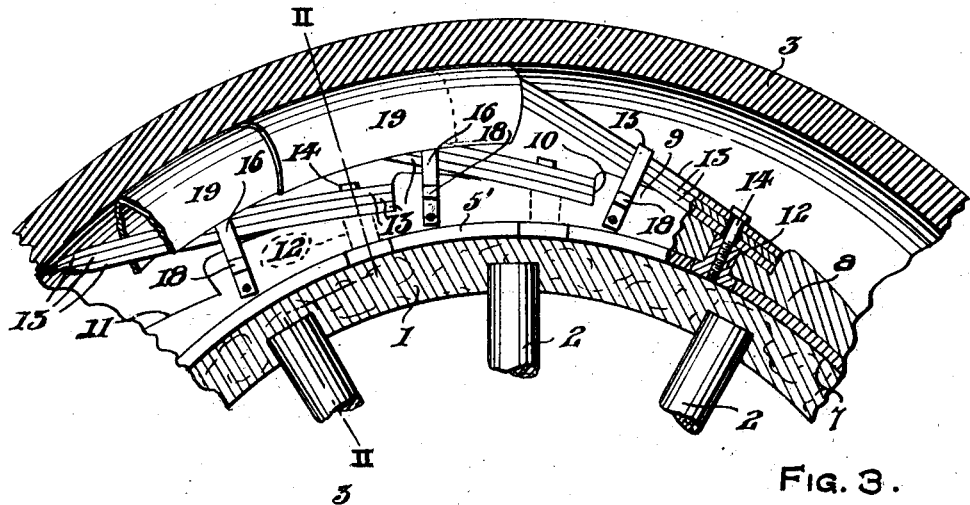
FIG. 1.
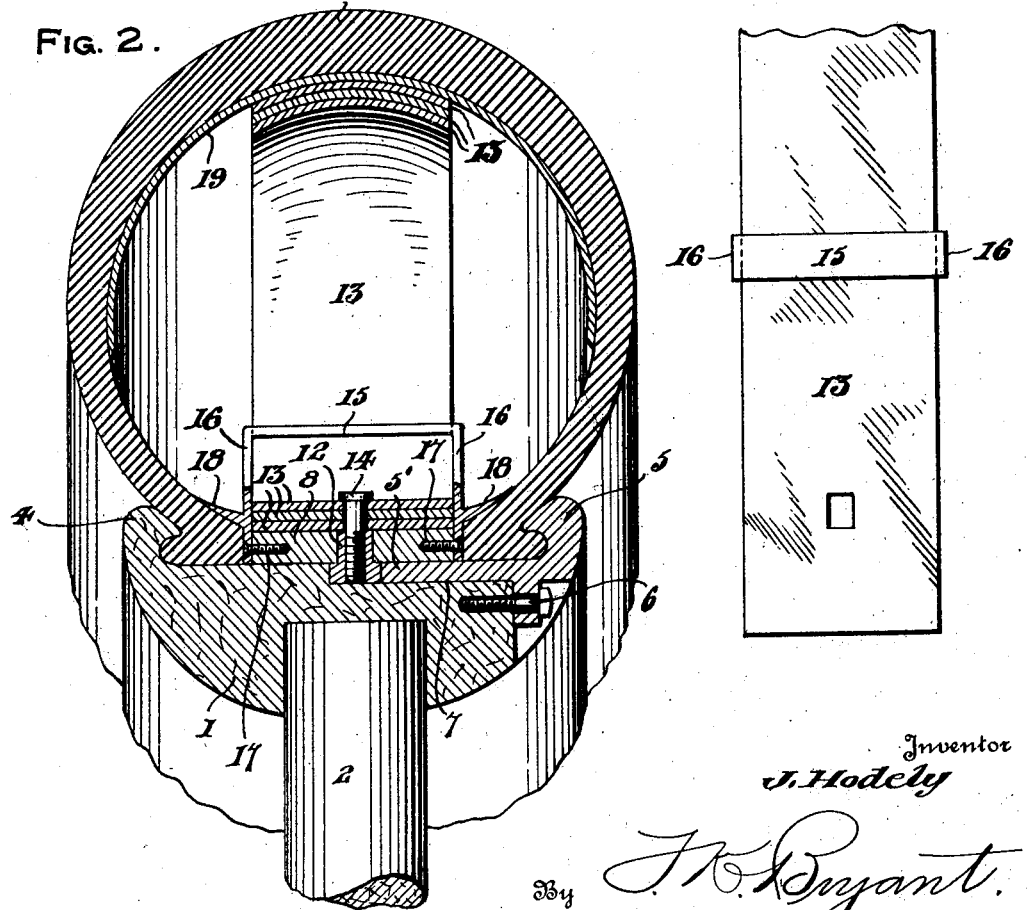
FIG. 2.
FIG. 3.
Inventor
J. Hodely
By J. K. Bryant.
Attorney

UNITED STATES PATENT OFFICE.

JOHN HODELY, OF SHINGLETON, MICHIGAN.

CUSHION TIRE.

1,406,016.

Specification of Letters Patent.  Patented Feb. 7, 1922.

Application filed October 29, 1921. Serial No. 511,287.

*To all whom it may concern:*

Be it known that I, JOHN HODELY, a citizen of Jugo-Slavia, residing at Shingleton, in the county of Alger and State of Michigan, have invented certain new and useful Improvements in Cushion Tires, of which the following is a specification.

This invention relates to certain new and useful improvements in cushion tires and has particular reference to the provision of spring devices enclosed within a tire shoe or casing to function in lieu of the usual pneumatic inner tube.

The primary object of the invention resides in the provision of a plurality of spring devices anchored to a novel form of band or ring secured to the felly of a wheel with overlapping transversely curved plate sections positioned in contact with the inner face of a tire shoe to be engaged by the outer free ends of the springs.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a longitudinal sectional view of a portion of a wheel showing the springs anchored to a band secured to the wheel felly and with the outer ends of the springs engaging curved plates positioned in contact with the inner face of the tire shoe, Figure 2 is a cross sectional view taken on line II—II of Fig. 1 showing the manner of securing the springs to the felly band, and Figure 3 is a fragmentary top plan view of one of the spring devices.

Referring more in detail to the accompanying drawing there is illustrated a cushion tire embodying metallic springs in lieu of the usual pneumatic inner tube, the wheel including a felly 1 having the usual form of spokes 2 and tire shoe 3 secured to the felly at the beaded portions thereof by the integral flange 4 carried by the felly 1 and a removable flange 5 secured to the opposite side of the felly and engaging the adjacent tire bead and retained in position on the felly by the anchoring bolts 6, the felly being cut away as at 7 to provide a side seat for the extension 5' of the removable flange 5.

A felly band 8 is supported on the felly 1 and the extension 5' of the removable flange 5, said band 8 being provided with a plurality of outwardly directed adjacently positioned block-like enlargements 9 having abrupt end shoulders 10 and outer curved faces 11. The inner end of each enlargement 9 adjacent the shoulder 10 of the adjacent enlargement is provided with an opening for the reception of an internally threaded thimble 12 that rests upon the seat 7 of the felly as shown in Figs. 1 and 2, and for purposes presently to appear.

A spring device is associated with each enlargement 9 of the felly band 8, each spring device including a plurality of flat leaf springs 13 mounted upon an enlargement 9 and having the inner ends engaging the shoulder 10 of the adjacent enlargement, the springs being anchored to the enlargement by registering openings therein for the reception of a screw bolt 14 threaded into a thimble 12 as clearly illustrated. To limit the outward movement of the outer ends of the springs inverted U-shaped straps including cross arms 15 and side legs 16 are each associated with a separate set of springs, the side legs 16 of the strap being secured as at 17 to the opposite sides of the felly band 8 with the inner edges of the tire beads engaging the outer sides of the strap, while side extensions 18 carried by the legs 16 overlie the inner face of the tire beads to cooperate with the rim flanges 4 and 5 for retaining the tire shoe in position on the felly, the strap being positioned adjacent the shoulder 10 of the enlargement and in a manner to permit limited movement of the springs in an outward direction.

A plurality of overlapping plates 19 transversely curved as shown in Figs. 1 and 2 are positioned for engagement with the inner face of the outer side of the tire shoe, the plates 19 forming an engaging abutment for the free ends of the springs 13 to protect the inner wall of the tire. Obviously the plates 19 may be held in proper relation to each other in various ways either by interconnecting the same or attachment of the plates to the tire shoe 3, but as the specific manner in which this is done forms no part of the present invention showing thereof is not made.

From the above detail description of the device it is thought that the construction and operation thereof will at once be apparent, it being noted that the spring straps 15 have the side extensions 18 to cooperate with the felly flanges 4 and 5 for retaining the tire in position on the felly, the springs being anchored to the enlargements 9 by the screws 14 and giving the desired resiliency to the wheel by slidably engaging the curved plates 19. In removing the tire from the felly, it is only necessary to release the removable flange 5, at which time the tire 3 carrying the spring devices and including the felly band 8 are bodily removed from the felly 1, while the mounting of the tire upon the felly is accomplished by the reverse operation.

While there is herein shown and described the preferred embodiment of the present invention, it is nevertheless to be understood that minor changes may be made therein without departing from the spirit and scope of the invention.

What is claimed as new is:—

1. A cushion wheel of the type described, comprising a felly, a band mounted on the felly having block-like enlargements, a plurality of spring devices, each secured to an enlargement, a tire shoe enclosing the spring devices and band, and mounted on the felly, strap members limiting outward movement of the spring devices, side extensions carried by the strap members overlying the inner faces of the bead portions of the tire shoe, and clincher flanges carried by the felly.

2. A cushion wheel of the type described, comprising a felly, a band mounted on the felly having block-like enlargements, a plurality of spring devices, each secured to an enlargement, a tire shoe enclosing the spring devices and band, and mounted on the felly, inverted U-shaped straps secured to the opposite faces of the enlargements for limiting outward movement of the springs, side extensions carried by the straps overlying the inner faces of the tire shoe beads, and clincher flanges for the tire shoe carried by the felly.

3. A cushion wheel of the type described, comprising a felly, a band mounted on the felly having block-like enlargements, a plurality of spring devices, each secured to an enlargement, a tire shoe enclosing the spring devices and band, and mounted on the felly, inverted U-shaped straps secured to the opposite faces of the enlargements for limiting outward movement of the springs, side extensions carried by the straps overlying the inner faces of the tire shoe beads, clincher flanges for the tire shoe carried by the felly, and overlapping transversely curved plates positioned between the inner face of the tire shoe and the free ends of the spring devices.

In testimony whereof I affix my signature.

JOHN HODELY.